3,031,429
THIOPHTHALIDE PREPARATION

William G. Toland, San Rafael, Calif., assignor to California Research Corporation, San Francisco, Calif., a corporation of Delaware
No Drawing. Filed Sept. 25, 1958, Ser. No. 763,186
11 Claims. (Cl. 260—330.5)

This invention relates to the preparation of thiophthalide.

Thiophthalide, $C_8H_6SO$ is useful in the detergent field, as a synthetic fiber and polymer intermediate, and in the preparation of o-mercaptomethylbenzoic acid, which readily can be obtained from the salt which results from hydrolysis of thiophthalide with a base.

The oxidation of orthoalkyl substituted benzenes, using an aqueous medium containing an oxidizing agent comprising sulfur (either as such or in a sulfur-containing compound) is known to produce carboxylic acids under certain conditions. The oxidizing medium may comprise, for example, sulfur, water, and ammonia, sulfur and water, sulfur dioxide and water, sulfuric acid and water, or a water-soluble sulfate such as ammonium sulfate or an alkali metal sulfate.

It has now been discovered that by proper selection of the operating conditions and sequence of operating steps, oxidizing agents comprising sulfur and water can be used to produce thiophthalide instead of carboxylic acids from orthoxylene and substituted thiophthalide from other orthoalkyl substituted benzenes. Although any of the agents comprising sulfur are operable in the process of the present invention, the preferred ones are sulfur and water, sulfur dioxide and water, and sulfuric acid and water.

In accordance with the present invention, there is provided a process for producing thiophthalide which comprises producing a reaction mixture by oxidizing an orthoalkyl substituted benzene at about from 500° to 700° F., preferably about from 600° to 650° F., and about from 1000 to 5000 p.s.i.g., preferably about from 2000 to 3500 p.s.i.g., with an oxidizing agent comprising sulfur and water, cooling said reaction mixture while preventing any substantial decrease of pressure on said reaction mixture other than the pressure decrease attributable to said cooling, thereby producing a cooled mixture containing thiophthalide, and recovering thiophthalide from said cooled mixture by conventional methods.

Thiophthalide is a slightly water-soluble steam distillable low melting solid. It can be phase-separated from reaction products in crude form or extracted with solvents, such as xylene, and purified by distillation (boiling point 150° C. at 8 mm. Hg) and/or by crystallization.

While an initiator or triggering agent for the reaction may not be needed with some oxidizing agents, particularly if sufficient time is allowed for the reaction to get under way, it will be preferable in most cases to use such an intiator. The initiator may be a water-soluble sulfur compound, other than the sulfur or sulfur-containing component of the oxidizing agent, containing sulfur at a valence below plus 6. More specifically, the initiator may be, for example, sulfur dioxide, a water-soluble sulfite, a water-soluble thiosulfate, or a water-soluble sulfide such as hydrogen sulfide, ammonium sulfide, ammonium polysulfide, sodium sulfide, potassium sulfide, sodium polysulfide, or potassium polysulfide. Of these materials, the sulfides and polysulfides are especially effective and are preferred initiators for the reaction. The most preferable initiator is hydrogen sulfide. The agent is used in a minor amount, for example from about 0.05 to 0.3 mol per mol of methyl group in the compound to be oxidized. In the case of $H_2S$, these limitations do not apply, because the $H_2S$ is not reduced during the reaction. As much as 5.0 mols of $H_2S$ per mol of organic charge has been found to be operable.

The vigor and completeness of the oxidation reaction increases with temperature and the completion or the oxidation of the organic compound tends to increase with reaction time. The extent of the oxidation is controllable by varying time, temperature and pressure.

The oxidation may be conducted either batchwise or in a continuous process.

When batch operation is employed, the organic compound to be oxidized, the oxidizing agent, and the triggering agent, if used, may be introduced into a bomb or an autoclave which is then sealed and heated to reaction temperature with shaking to facilitate contact of the reactants. The size of the bomb may be so related to the quantity of the materials introduced therein that upon heating to reaction temperature the desired pressure is built up autogenously. After the reactants have been held at reaction temperature for a time sufficient to effect the desired degree of oxidation of the organic compound, the bomb may be cooled under pressure to produce a cooled reaction mixture containing thiophthalide, which then may be separated from the cooled reaction mixture by conventional methods.

When a continuous process is employed, an elongated tubular reaction zone is desirable. The reactants may be passed continuously through the reaction zone at reaction temperature and pressure to produce a reaction mixture, which may be continuously cooled under the desired pressure to produce a cooled reaction mixture containing thiophthalide, from which the thiophthalide may be separated by conventional methods.

It will be found preferable to observe a particular sequence of mixing reactants to achieve the best results in most cases. Side reactions may be minimized by preventing contact as much as possible between the sulfur-containing oxidizing agent and the organic material to be oxidized at temperatures other than reaction temperature.

It will be found preferable during the cooling of the reaction mixture under pressure to maintain in the reaction zone at least one mol of $H_2S$ per mol of organic material charged to the zone. Desirably the cooling accomplished under pressure will be from reaction temperature to below about 500° F., preferably to a range of about 300° to 500° F., and during the oxidation and cooling the pressure will be in the range of about 2000 p.s.i.g. to 3500 p.s.i.g.

The following examples will serve to further illustrate the effectiveness of the process of the present invention in producing thiophthalide:

|  | Example No. | | | | |
|---|---|---|---|---|---|
|  | 1 | 2 | 3 | 4 | 5 |
| Feed, Kind | OX[1], 95% | OX[1], 99% | OX[1], 99% | OX[1], 95% | OX[1], 95% |
| Rate, cc./min | 5 | 5 | 2 | | |
| Grams | 106 | 106 | 106 | 425 | 425 |
| Mols | 1.0 | 1.0 | 1.0 | 4.0 | 4.0 |
| Sulfur, Form | Elemental | Elemental | Elemental | Liq. $SO_2$ | Liq. $SO_2$ |
| Rate, cc./min | | | | 5 | 10 |
| Grams | 200 | 192 | 192 | 544 | 317 |
| Mols | 6.25 | 6.0 | 6.0 | 8.5 | 4.95 |
| Water: | | | | | |
| Grams | 1,800 | 1,800 | 1,800 | 1,800 | 1,800 |
| Mols | 100 | 100 | 100 | 100 | 100 |
| $H_2S$, Grams | 170 | | | 5 | 0.5 |
| Temperature, °F | 650 | 650 | 650 | 635 | 630 |
| Pressure, Max., p.s.i.g | 3,350 | 2,800 | 2,850 | 3,675 | 2,800 |
| Time at Temperature, Min. | 30 | 20 | 110 | 20 | 60 |
| Products: | | | | | |
| Feed Recovery— | | | | | |
| Grams | 10.3 | 19.1 | 7.3 | (0) | 59.1 |
| Mols | 0.180 | 0.069 | 0.014 | 0 | 0.557 |
| $H_2S$— | | | | | |
| Grams | | 113.9 | 146 | 295 | 72 |
| Mols | | 3.35 | 4.3 | 8.7 | 2.1 |
| Sulfur— | | | | | |
| Grams | 58 | 33.0 | 31.7 | 121.5 | 1.3 |
| Mols | 1.81 | 1.03 | 1.0 | 3.8 | 0.04 |
| Benzoic Acid: | | | | | |
| Grams | 0 | 0 | 0 | 15.8 | 0 |
| Mols | 0 | 0 | 0 | 0.129 | 0 |
| Toluic Acid: | | | | | |
| Grams | Trace | 14.0 | 42.7 | 38.5 | 51.6 |
| Mols | | 0.103 | 0.314 | 0.283 | 0.379 |
| Phthalic Acid: | | | | | |
| Grams | 0 | | 0 | 231.1 | 36.0 |
| Mols | 0 | | 0 | 1.39 | 0.217 |
| Thiophthalide: | | | | | |
| Grams | 76.4 | 77.0 | 34.4 | 131.8 | 58.3 |
| Mols | 0.51 | 0.513 | 0.229 | 0.879 | 0.389 |
| Feed Conversion, percent | 82.0 | 93.1 | 98.6 | (100) | 77.9 |
| Yield, percent of Theory: | | | | | |
| Benzoic Acid | 0 | 0 | 0 | 3.2 | 0 |
| Toluic Acid | 0 | 11.1 | 31.9 | 7.1 | 21.8 |
| Phthalic Acid | 0 | | 0 | 34.8 | 19.0 |
| Thiophthalide | 62.2 | 52.2 | 23.2 | 22.0 | 21.1 |

[1] Orthoxylene.

In Examples 1, 2 and 3, the sulfur and water first were heated together, and then the xylene was added to the reactor at reaction temperature. In Examples 4 and 5, the xylene and water first were heated together, and then the $SO_2$ was added to the reactor at reaction temperature.

In Examples 1, 2, 3 and 5, the reaction mix was cooled, and then the cooled liquid and vapor phases were bled from the reactor. In Example 4, vapor was bled from the reactor at 500° F., the remaining mixture was cooled, and the cooled mixture was bled from the reactor.

From the foregoing it may be seen that by a novel combination of conditions and operating steps thiophthalide may be produced from orthoxylene using oxidizing agents and reactants heretofore known to be capable of producing carboxylic acids, but not known to be capable of producing thiophthalide.

Not only is orthoxylene suitable as a raw material for this reaction, but also its partial oxidation products, such as orthotolyl alcohol, orthotolualdehyde, and orthotoluic acid. Compounds capable of being converted to these compounds under reaction conditions could also be used, as orthoxylyl chloride and orthoxylylene dichloride.

While any oxidizing agent comprising sulfur is comprehended by the process of the present invention, particularly good results are obtained using those oxidizing agents containing no cations other than hydrogen. Thus, sulfur and water, sulfur dioxide and water, and sulfuric acid and water oxidizing agents will be found especially effective and desirable.

What is claimed is:

1. A process as in claim 2, with the addition to the reaction zone as a triggering agent of a minor amount of a material other than the material of the oxidizing agent, said added material comprising sulfur at a valence below plus 6.

2. A process for producing thiophthalide, which comprises producing a reaction mixture by oxidizing orthoxylene at about from 600° to 650° F. and about from 2000 to 3500 p.s.i.g. with an oxidizing agent selected from the group consisting of sulfur and water, sulfur dioxide and water, and sulfuric acid and water, cooling said reaction mixture under pressure to a temperature below about 500° F. in the presence of at least one mol of $H_2S$ per mol of xylene feed, thereby producing a cooled mixture containing thiophthalide, and recovering thiophthalide from said cooled mixture.

3. A process as in claim 2, wherein said oxidizing agent is sulfur and water.

4. A process as in claim 6, wherein said oxidizing agent is sulfur dioxide and water.

5. A process as in claim 2, wherein said oxidizing agent is sulfuric acid and water.

6. A process as in claim 2, wherein said reaction mixture is cooled to a temperature below about 500° F. and above about 300° F. prior to separating thiophthalide from said cooled mixture.

7. A process for producing thiophthalide, which comprises oxidizing orthoxylene at about from 600° to 650° F. with an oxidizing agent selected from the group consisting of sulfur and water, sulfur dioxide and water, and sulfuric acid and water, cooling the resulting reaction mixture under pressure to a temperature below about 500° F., thereby producing a cooled mixture containing thiophthalide, said oxidizing and said cooling both being accomplished at about from 2000 to 3500 p.s.i.g., and recovering thiophthalide from said cooled mixture.

8. A process as in claim 7, wherein said oxidizing agent is sulfur and water.

9. A process as in claim 7, wherein said oxidizing agent is sulfur dioxide and hydrogen sulfide.

10. A process as in claim 7, wherein said oxidizing agent is sulfuric acid and water.

11. A process as in claim 7 wherein said reaction mixture is cooled to a temperature below about 500° F. and above about 300° F. prior to separating thiophthalide from said cooled mixture.

References Cited in the file of this patent

UNITED STATES PATENTS

| 2,587,666 | Toland | Mar. 4, 1952 |
| 2,610,980 | Naylor | Sept. 16, 1952 |
| 2,662,923 | Reeder | Dec. 15, 1953 |

UNITED STATES PATENT OFFICE
CERTIFICATE OF CORRECTION

Patent No. 3,031,429                      April 24, 1962

William G. Toland

It is hereby certified that error appears in the above numbered patent requiring correction and that the said Letters Patent should read as corrected below.

Column 2, line 17, for "or" read -- of --; column 4, line 29, for the claim reference numeral "6" read -- 2 --.

Signed and sealed this 4th day of September 1962.

SEAL)
ttest:

RNEST W. SWIDER
ttesting Officer

DAVID L. LADD
Commissioner of Patents